(12) United States Patent
Zimmerman et al.

(10) Patent No.: US 10,217,149 B2
(45) Date of Patent: Feb. 26, 2019

(54) METHOD AND SYSTEM FOR EFFECTUATING AN ELECTRONIC PURCHASE TRANSACTION BETWEEN A CONSUMER DEVICE AND A MERCHANT

(71) Applicant: Personali Inc., Waltham, MA (US)

(72) Inventors: Keren Zimmerman, Tel Aviv (IL); Noam Javits, Tel Aviv (IL)

(73) Assignee: Personali Inc., New York, NY (US)

( * ) Notice: Subject to any disclaimer, the term of this patent is extended or adjusted under 35 U.S.C. 154(b) by 412 days.

(21) Appl. No.: 14/870,620

(22) Filed: Sep. 30, 2015

(65) Prior Publication Data

US 2016/0086243 A1 Mar. 24, 2016

Related U.S. Application Data

(63) Continuation of application No. PCT/US2014/056743, filed on Sep. 22, 2014.

(60) Provisional application No. 61/881,361, filed on Sep. 23, 2013, provisional application No. 61/908,757, filed on Nov. 26, 2013.

(51) Int. Cl.
*G06Q 30/00* (2012.01)
*G06Q 30/06* (2012.01)
*G06Q 30/02* (2012.01)

(52) U.S. Cl.
CPC ..... *G06Q 30/0611* (2013.01); *G06Q 30/0269* (2013.01); *G06Q 30/0601* (2013.01); *G06Q 30/0631* (2013.01); *G06Q 30/0641* (2013.01)

(58) Field of Classification Search
CPC .......................................... G06Q 30/06–30/08

USPC ............................................... 705/26.1–27.2
See application file for complete search history.

(56) References Cited

U.S. PATENT DOCUMENTS

| | | | |
|---|---|---|---|
| 7,437,450 B1 | 10/2008 | Gore et al. | |
| 7,836,176 B2 | 11/2010 | Gore et al. | |
| 8,073,747 B2 | 12/2011 | Kane et al. | |

(Continued)

FOREIGN PATENT DOCUMENTS

| | | | |
|---|---|---|---|
| WO | 2009002999 A2 | 12/2008 | |
| WO | WO-2009002999 A2 * | 12/2008 | ....... G06F 17/30864 |
| WO | 2012129224 A1 | 9/2012 | |

OTHER PUBLICATIONS

Definition of Timing by Merriam-Webster (Merriam-Webster, updated on Apr. 25, 2018, downloaded Apr. 27, 2018) "https://www.merriam-webster.com/dictionary/timing" (Year: 2018).*

(Continued)

*Primary Examiner* — Ethan D Civan
(74) *Attorney, Agent, or Firm* — M&B IP Analysts, LLC

(57) ABSTRACT

The system and methods thereof provide for a delayed display of content on a consumer device. A user log-on from a consumer device to an electronic commerce (e-commerce) server is acknowledged. One or more parameters related to the user as extracted from the consumer device is identified. Respective thereto a threshold value for timing a display of motivational content on the consumer device is adjusted, thereby encouraging purchases of goods or services using the e-commerce server. The motivational content is selected respective of the parameters collected from the consumer device. The displayed content may provide a web link through which a counter offer may be sent from the consumer device to the e-commerce server.

17 Claims, 4 Drawing Sheets

(56) References Cited

U.S. PATENT DOCUMENTS

| | | | |
|---|---|---|---|
| 8,380,622 B2 | 2/2013 | Bushman et al. | |
| 2006/0173773 A1* | 8/2006 | Ettinger, Jr. | G06Q 30/08 705/37 |
| 2007/0073593 A1* | 3/2007 | Perry | G06Q 30/02 705/26.64 |
| 2007/0101276 A1 | 5/2007 | Yuen | |

OTHER PUBLICATIONS

The International Search Report and The Written Opinion of the International Searching Authority for PCT/US2014/056743, ISA/RU, Moscow, Russia, dated Dec. 18, 2014.

\* cited by examiner

METHOD AND SYSTEM FOR EFFECTUATING AN ELECTRONIC PURCHASE TRANSACTION BETWEEN A CONSUMER DEVICE AND A MERCHANT

CROSS REFERENCE TO RELATED APPLICATIONS

This application is a continuation of International Application No. PCT/US2014/056743 filed Sep. 22, 2014 which claims the benefit of U.S. Provisional Patent Application No. 61/881,361 filed Sep. 23, 2013, and U.S. Provisional Patent Application No. 61/908,757 filed on Nov. 26, 2013, the contents of which are hereby incorporated by reference.

TECHNICAL FIELD

The invention generally relates to a computerized negotiation platform for electronic commerce (E-commerce) web-sites and, more specifically, to a system and methods for motivating consumers to negotiate with merchants over the web via delayed display of content.

DESCRIPTION OF THE BACKGROUND

The way people shop has significantly progressed since the development of the worldwide web (WWW). Consumers can now shop from the convenience of their home, office, or while on the road using portable devices. Popular web-sites such as Amazon.com® and Shopping.com®, though different by nature, allow consumers to purchase goods directly through the web-site, sometimes at much lower prices than the prices suggested by local merchants. From a merchant's point of view, such web-sites allow access to a worldwide market of consumers.

The services provided by web-sites such as Shopping.com® belong to a category of web-sites that provide comparison shopping engines (CSEs) that assist consumers by presenting prices and information about a product the consumer may be interested in purchasing. In response to a consumer's query, the consumer is provided with a list of possibilities based on characteristics such as price and popularity. The CSE is generally considered to be an effective tool for consumers.

As another example, Priceline.com® allows a consumer to make a bid for a traveling service, such as a hotel room reservation. In response, the service provider (e.g., either Priceline.com or the hotel), can either accept or reject that bid. In response, the consumer can either search for another alternative or raise the bid until it is accepted by the service provider. The disadvantage of such an approach is that the consumer does not know the particulars of the vendor or service provider. For example, the consumer selects the area and rating of a hotel he or she desires to stay at, but the consumer cannot bid on a specific hotel. Further, all bids placed by the consumer are binding and no true negotiation take place.

Other disadvantages associated with electronic commerce (e-commerce) web-sites relate to the lack of personal interaction between the consumer and the merchant. At best, the personal interaction is limited to a chat with a sale representative who can provide more information about the goods/services that can be purchased through the e-commerce web-site. Another way to motivate consumers to purchase through e-commerce web-sites is to offer generic discounts to all the consumers visiting the web-site.

In the existing art, there is no solution that allows customized personal interaction with the consumers to motivate them to purchase on-line. Thus, it would be advantageous to provide a solution that overcomes the disadvantages of e-commerce web-sites.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all embodiments. Its sole purpose is to present some concepts of one or more embodiments in a simplified form as a prelude to the more detailed description that is presented later. For convenience, the term some embodiments may be used herein to refer to a single aspect or multiple embodiments of the disclosure.

The disclosure relates in various embodiments to a method for effectuating an electronic transaction between a consumer device and a merchant device. The method comprises receiving an indication that a user of the consumer device browses products for sale on an e-commerce web-site; collecting at least one parameter related to the user of the consumer device; determining an interest of the user respective of a product offered by the merchant on the e-commerce web-site, wherein the determination of the user interest is performed based on the least one parameter related to the user; adjusting a time threshold value based in part on the determined user interest; selecting at least one motivational content item for display on the consumer device; and causing a display of the selected at least one motivational content item on a display of the consumer device, wherein the timing of the display is respective of the time threshold value.

The disclosure also relates in various embodiments to a system for effectuating an electronic transaction between a consumer device and a merchant device. The system comprises a processor; and a memory coupled to the processor, the memory contains instructions that, when executed by the processor, configured the system to: receiving an indication that a user of the consumer device browses products for sale on an e-commerce web-site; collecting at least one parameter related to the user of the consumer device; determining an interest of the user respective of a product offered by the merchant on the e-commerce web-site, wherein the determination of the user interest is performed based on the least one parameter related to the user; adjusting a time threshold value based in part on the determined user interest; selecting at least one motivational content item for display on the consumer device; and causing a display of the selected at least motivational content item, on a display of the consumer device, wherein the timing of the display is respective of the time threshold value.

BRIEF DESCRIPTION OF THE DRAWINGS

The subject matter disclosed herein is particularly pointed out and distinctly claimed in the claims at the conclusion of the specification. The foregoing and other objects, features, and advantages of the invention will be apparent from the following detailed description taken in conjunction with the accompanying drawings.

DETAILED DESCRIPTION

Figure 1:
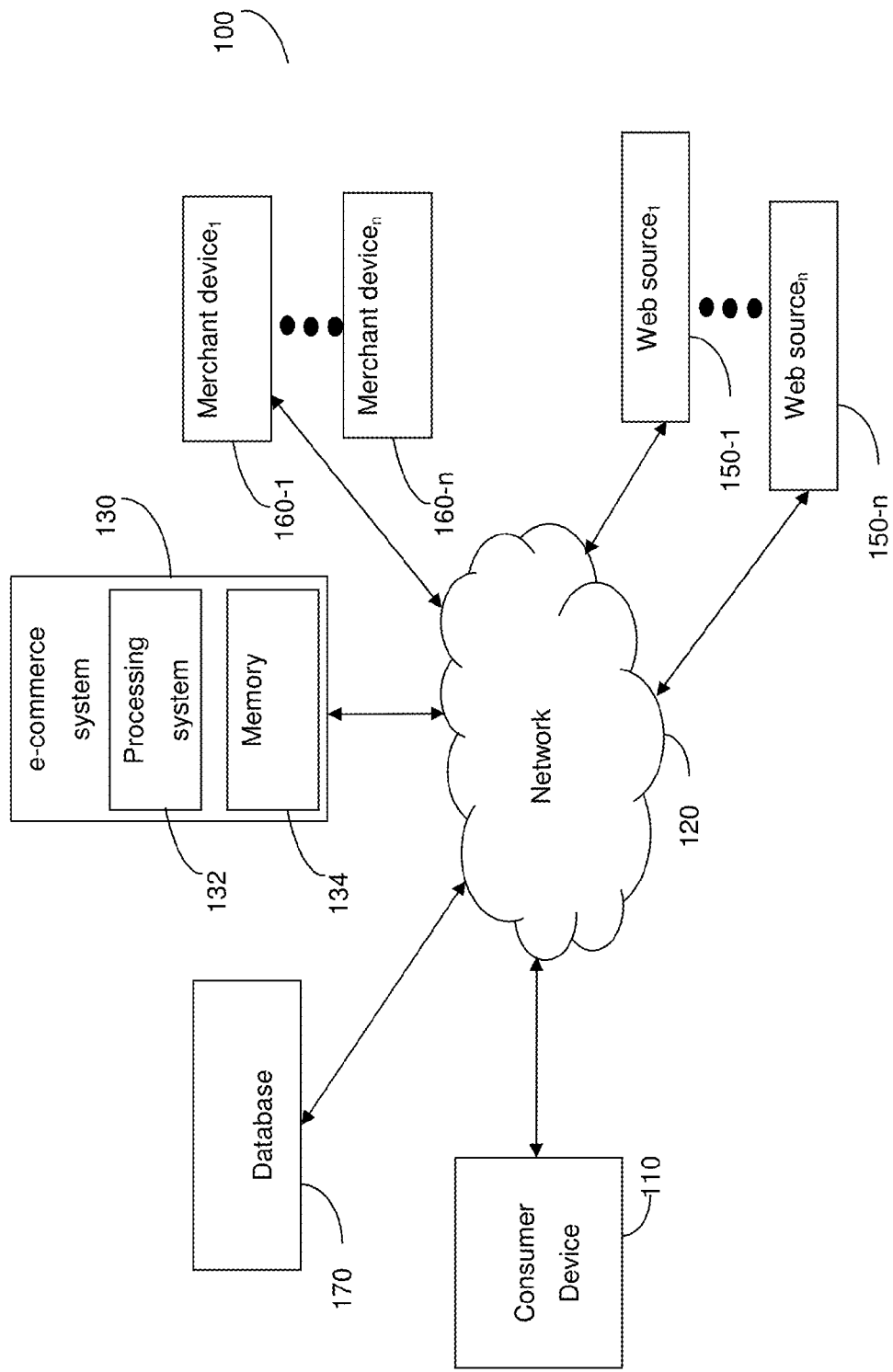
FIG. 1 is a schematic diagram of a system in accordance with an embodiment.

The embodiments disclosed herein are only examples of the many possible advantageous uses and implementations of the innovative teachings presented herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

As an example of the above, some of the embodiments disclosed herein configure a system to enable a delayed display of content on a consumer device in response to a costumer browsing an e-commerce web-site. Upon determination that a user (consumer) may have an interest in receiving an offer to purchase a certain good or service (hereinafter collectivity referred to as a "product"), one or more parameters related to the user is identified as extracted from the consumer device. Based on the identified parameters, the system is configured to adjust a threshold value for timing a display of motivational content on the consumer device. The motivational content is designed to incentivize the user to purchase the product from the e-commerce web-site. The motivational content is selected respective of the parameters extracted from the consumer device. In an embodiment, the motivational content is displayed in response to a web link through which a counter offer may be sent from the consumer device to the e-commerce web-site.

FIG. 1 depicts an exemplary and non-limiting schematic diagram of a network system 100 utilized to describe the various disclosed embodiments. Accordingly, a user, by means of a consumer device 110, is communicatively connected to a network 120. The consumer device 110 may be, but it not limited to, a personal computer (PC), a laptop computer, a smart phone, a wearable computing device, a tablet computer, and so on.

The consumer device 110 is configured to allow access to web-sites for at least the purpose of performing e-commerce transactions. The network 120 can be wired or wireless, a local area network (LAN), a wide area network (WAN), a metro area network (MAN), the Internet, the worldwide web (WWW), the like, and any combinations thereof.

An e-commerce system 130 is further connected to the network 120 and configured to perform, e.g., some of the embodiments described in detail herein below. The e-commerce system 130 typically comprises a processing system 132 connected to a memory 134. The memory 134 contains instructions that are executed by the processing system 132.

Specifically, the memory 132 may include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system 132 to perform the various functions described herein.

The processing system 132 may comprise or be a component of a larger processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The consumer device 110 can communicate with one or more web sources 150-1 through 150-$n$ (hereinafter referred to collectively as web sources 150 or individually as a web source 150, merely for simplicity purposes) through the e-commerce system 130. The web sources 150 may be electronic commerce (e-commerce) web-sites, travel web-sites, services web-sites, and any other web source through which the user is able to purchase goods or services. The web sources 150-1 through 150-$n$ are respectively operative by merchant devices 160-1 through 160-$n$. The merchant devices 160-1 through 160-$n$ are operated by merchants that offer products on the e-commerce web-site. In an embodiment, a database 170 is connected to the network 120 for storing information related to the users of devices 110 and merchants.

The e-commerce system 130 is configured to track the activity of a user of the consumer device 110 with respect to the user interaction with the web sources 150. The tracking of the user activity allows collection of parameters related to the user of the consumer device 110. The collection of parameters may be achieved by crawling through the web sources 150 and identifying the user activity therein. In another embodiment, the collection parameters are collected using a piece of code (script) executed over the device 110 when accessing a web source. For example, when a user browses an e-commerce web-site hosted by the web source 150, a script is downloaded to the device 110 and executed thereon (e.g., by the browser). The script may gather information, such as which products the user viewed, how much time the user spent on that e-commerce web-site, and so on.

It should be noted that the e-commerce system 130 gathers information from a plurality of sources that may be associated with a specific user and/or a specific consumer device 110. The system 130 can gather parameters respective of a user from different devices associated with the user. For example, when a user browses an e-commerce web-site using the user's smart phone and PC, parameters gathered from each of these devices may be gathered by the e-commerce system 130.

The user parameters may be, but are not limited to, behavioral information related to the user, demographic information, user experience, the source through which the user is directed or redirected to the web source, and so on. Behavioral information may include, for example, the amount of time the user spent in the web source 150, the web-pages that the user visited through the web sources 150, and the user's interaction with each web-page. Information related to user experience may include, for example, whether the user has previously visited the web source, the number of times the user previously visited the web source, and so on.

Based on the gathered parameters, a display threshold for displaying motivational content on the consumer device 110 is set or otherwise adjusted by the e-commerce system 130. The display threshold defines when motivational content should display on the consumer device 110. The display threshold may be, for example, time based, activity based, a combination thereof, and so on. It should be noted that the display threshold is generated respective of each user of a consumer device 110.

In an embodiment, a combination of parameters may be used to determine the adjustable display threshold, or multiple thresholds used with rules of engagement may be provided to determine overall threshold crossing. Upon crossing the display threshold(s), at least one motivational content item is selected and displayed on the consumer device 110. The motivational content items are designed to incite users to purchase products from the merchants through the web sources 150. According to another embodiment, the threshold may be predetermined by any one of the merchant devices 160.

As a non-limiting example of a combination of parameters used for a display threshold, the display threshold may comprise the requirements of "passage of 30 seconds without action" and "making of an offer." Thus, the threshold has been crossed and motivational content is displayed only after the user has both made an offer and waited 30 seconds without taking any further actions. In an embodiment, it may further be required that the passage of 30 seconds without action occur after the making of the offer for the threshold to have been crossed.

In an embodiment, the motivational content items may be selected by the e-commerce system 130. The selection of the motivational content items to display may be made by the merchant device 160. That is, the merchant device 160 provides a list of incentives, a number of available products, a merchant counter offer, and so on, to motivate the user to complete the transaction. A merchant may select any or all of the provided content items to display. The selection of content items by the merchant device 160 is generally performed based on recommendations provided by the e-commerce system 130. It should be noted that the selection may be that no motivational content item would be provided to the consumer device 110 respective of the user's parameters.

According to one embodiment, the selected motivational content items may include a web link through which the user can counter the offer for purchasing a product of interest through the web source 150. According to this embodiment, the e-commerce system 130 is configured to receive a counter offer from the consumer device 110. The number of counter offers that can be initiated and provided by the users may be limited to a predefined number. In an embodiment, the number of allowable counter offers is 1. In alternative embodiments, the counter offer may be a time-limited offer, i.e., an offer that must be approved by the client within a pre-configured period of time. The counter offer may be a binding offer, i.e., a consumer is obligated to complete the purchase transaction upon acceptance of the offer by the merchant.

It should be noted that, while some embodiments are described in a manner such that the e-commerce system 130 is a separate device from the web source 150, such description should not limit the scope of the disclosed embodiments. In some implementations, the e-commerce system 130 or the functionality of the e-commerce system 130 may be integrated in a web source 150.

Figure 2:
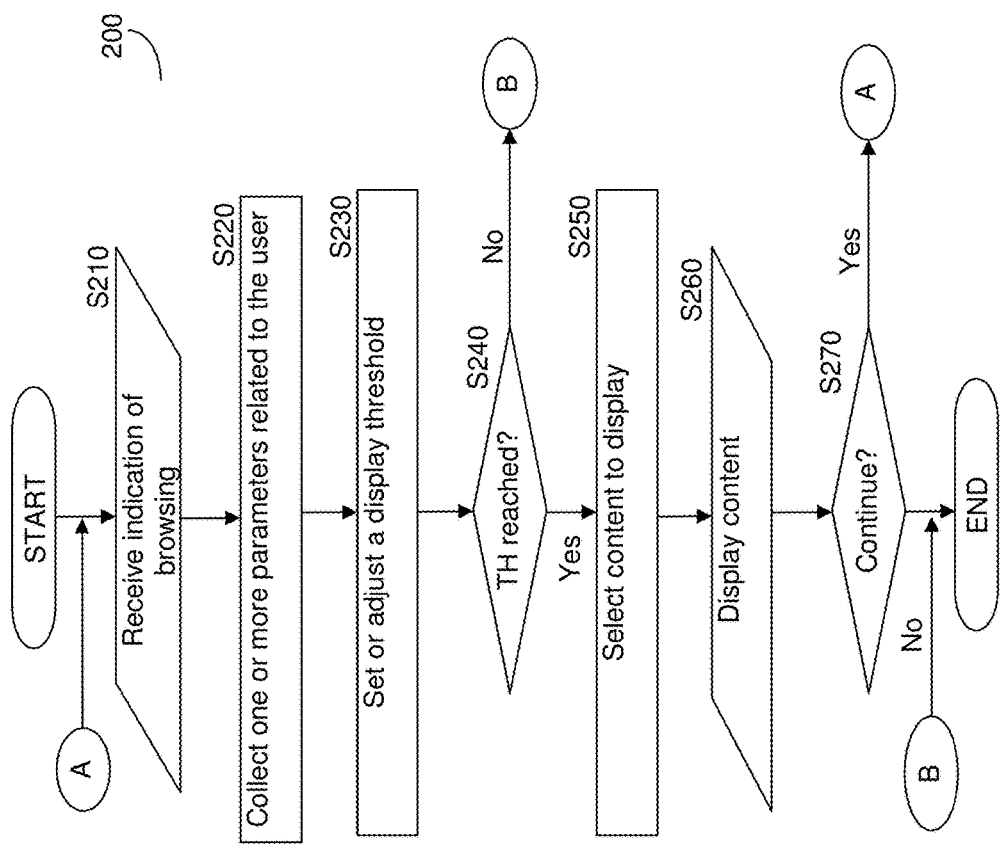
FIG. 2 is a flowchart describing the operation of the system in accordance with an embodiment.

FIG. 2 depicts an exemplary and non-limiting flowchart 200 describing a method for effectuating a purchase of a product from an e-commerce web source according to one embodiment. To this end, the method provides motivational content items to a user of a consumer device (e.g., the consumer device 110) to motivate the user to complete a purchase transaction. The selected content items and the timing for displaying such items are determined based on personalization of the user. In an embodiment, the method is performed by the e-commerce system 130.

In S210, an indication that a user of the consumer device browses products for sale on an e-commerce web-site (hosted by, e.g., one of web sources 150) is received. Such an indication may be provided by a script executed on the consumer device in response to accessing the e-commerce web-site. The indication may be derived from a cookie or similar data structure saved locally in the consumer device. It should be noted that access to the e-commerce web-site hosted on a web source can be facilitated by a browser, an application (app) installed on the consumer device, and the like.

In S220, parameters related to the user are collected. The parameters are collected during a current browsing session of the e-commerce web-site. The parameters may also be retrieved from external information such as, e.g., information stored in a database (e.g., the database 170) that maintains information about the user. For example, a first parameter collected during a current browsing session is a 'user name' of the user. Then, the parameter 'user name' is used to retrieve the demographics associated with the user. As noted above, the parameters may include any of: behavioral information related to the user, demographic information, user experience, the source through which the user directed or redirected to the web-site (a landing page), and so on. The behavioral information may include, for example, the amount of time the user spent browsing products on the e-commerce web-site, the web-pages the user visited through the e-commerce web-site, specific products reviewed by the user, and the user's interaction with each web-page.

According to one embodiment, the parameters are collected respective of the products and can be obtained from the merchant devices 160 and/or from the database 170. The product related parameters can be obtained in response to a selection of one or more products by the user. Such a parameter may include, for example, an inventory level, special offers, a minimum margin on the sale, and so on.

In S230, a display threshold for displaying motivational content items on the consumer device 110 is set or adjusted. A value to set or adjust the display threshold is determined based on the collected parameters. In an embodiment, a value of the display threshold is set to a relative high value and adjusted in S230 to a value that best first the user during a current browsing (or shopping) session.

The display threshold defines when or upon what event the delay to display motivational content items will end. The purpose of the display threshold is to time the display of the motivational content items based on the user interest in the product and the likelihood that the user would complete a purchase transaction. In an embodiment, the determination of the user interest in a product may be conducted implicitly upon identification that the user viewed, through the consumer device, a specification of the product, or that the user repetitively views a certain product or a product category, it is determined that the user is interested in the product. The determination of the user interest can also be based on an explicit indication. For example, the user adds the product to a shopping cart, but did not complete the transaction, thereby explicitly expressing interest in the product. As a result, an explicit determination that the user is interested in the product is made. Display thresholds are described further herein above with respect to FIG. 1.

For an "eager" user, the threshold value associated with the display threshold may be set to a value that is relatively higher than a threshold value set for a "reluctant" user. In an embodiment, the display threshold is a time-based threshold. As an example, for a reluctant user the threshold is 5 seconds, while for an eager user the threshold is 30 seconds. An eager user is typically a user who has expressed a high level of interest in the good or service, while a reluctant user is typically a user who has expressed a low level of interest in the good or service. Certain actions may be weighted according to the level of interest they typically represent.

As a non-limiting example of determining whether a user is eager or reluctant, the addition of a product to a shopping cart typically demonstrates a high level of interest, so a user who added the product to his or her shopping cart may be determined to be an eager user. As another non-limiting example, it is determined that a user has viewed several product reviews over the course of 20 minutes. Based on the relatively long amount of time that the user has been looking into the product reviews, it may be determined that the user is a reluctant user.

A value display threshold can include parameters related to the merchants. The value is based on the willingness of the merchant to facilitate the sale of the product. This can be determined based on the inventory level, a current offer price, a current margin on the sale, and so on. In exemplary embodiment, for an "eager" merchant, the display threshold may be adjusted to a value that is relatively lower than a threshold value adjusted for a "reluctant" merchant. As an example, assuming a time-based threshold, for a reluctant merchant the threshold is 30 seconds, while for an eager merchant, the threshold is 5 seconds. In an embodiment, a value display threshold is computed by factoring both the determination made with respect to the user interest in the product and the willingness of the merchant to sell. According to another embodiment, the value of the display threshold may be adjusted by factoring also average or statistical measures related to threshold set for users with similar parameters. Such information may be extracted from, e.g., the database 170.

In S240, it is checked whether the display threshold has been reached and, if so, execution continues with S250; otherwise, execution terminates. In an embodiment, the display threshold is a time-based threshold and the check is made with respect to the amount of time elapsed since the indication was received at S210. The timers for comparing the threshold may be set relative to a predefined event such as, e.g., adding a product to a shopping cart. Other timers for the threshold can be configured by an operator of the e-commerce web-site or the e-commerce system 130.

In S250, at least one motivational content item is selected to be displayed. The motivational content items are used to incentivize the user to purchase the products through the e-commerce web-site. A motivational content item may be, for example, a time limited discount coupon for purchasing the product of interest, recommendation of similar products, a link or a widget allowing the user to make provide a counter offer. Motivational content items are described further herein above with respect to FIG. 1.

In an embodiment, the selection of the content item is based on parameters collected respective of the user. Specifically, the selection of content items may be based on parameters related to the user activity on an e-commerce web-site used to determine the user interest in the product. In an embodiment, the selection of the content item is based on the user interest determined as described further herein above.

As an example, a user of the consumer device 110 searching for laundry machines is identified as located in Phoenix, Ariz. Respective thereto, the content displayed may include links to purchase laundry machines in a discounted price from shops located in Phoenix, Ariz.

Alternatively or collectively, the selection of the motivational content items to display may be made by the merchant device 160. That is, the merchant device 160 provides a list of incentives, a number of available products, a merchant counter offer, and so on, to motivate the user to complete the transaction. A merchant may select any or all of the provided content items to display. In an embodiment, the merchant may also input a content item to be displayed. As noted above, the selection of motivational content items by the merchant device 160 is generally performed in response to recommendations provided by the system 130.

In S260, a selected content item is sent to the consumer device 110 to be displayed thereon. It should be noted that multiple motivational content items can be selected, where each selected motivational content item may be displayed in response to a different display threshold value or in response to the same threshold value. For example, a first content item may display a discount of 5%, if the user does not respond to the first content item within 5 seconds, a second content item offering both a 5% discount and free shipping is provided. In addition, a content item showing the inventory for the product or a time window to complete the transaction may be displayed as well.

In S270, is checked whether execution will continue. If so, execution continues with S210; otherwise, execution terminates. The execution of the method may be terminated if, for example, the user purchased the product and/or there are no more content items to be displayed. According to one embodiment, the collected parameters, the selected content items, and/or purchases made by the user are saved in the database 170.

As a non-limiting example, an indication that a user browsers an e-commerce web-site by the consumer device 110 is received by the e-commerce system 130. The parameter received with respect to the user activity on the e-commerce web-site includes a location of the user (Manhattan, N.Y.), a product category of interest (refrigerators), and that a refrigerator model has been added to the user's shopping cart. Thus, based on these collected parameters, it is determined that the user has a high level of interest in product, i.e., this is an eager user. A parameter collected by a merchant device 160 indicates that a refrigerator model of the same brand is available for pick-up near the user's location. The display threshold is set to 30 seconds as the user shows high interest to complete the sale.

If the user did not complete the purchase transaction within 30 seconds after the e-commerce system 130 determines that the product has been added to the shopping cart, a link through which the user can counter the offer for purchasing the refrigerator from a nearby store may be provided. Therefore, the user will be incited to purchase the refrigerator.

Figure 3A:
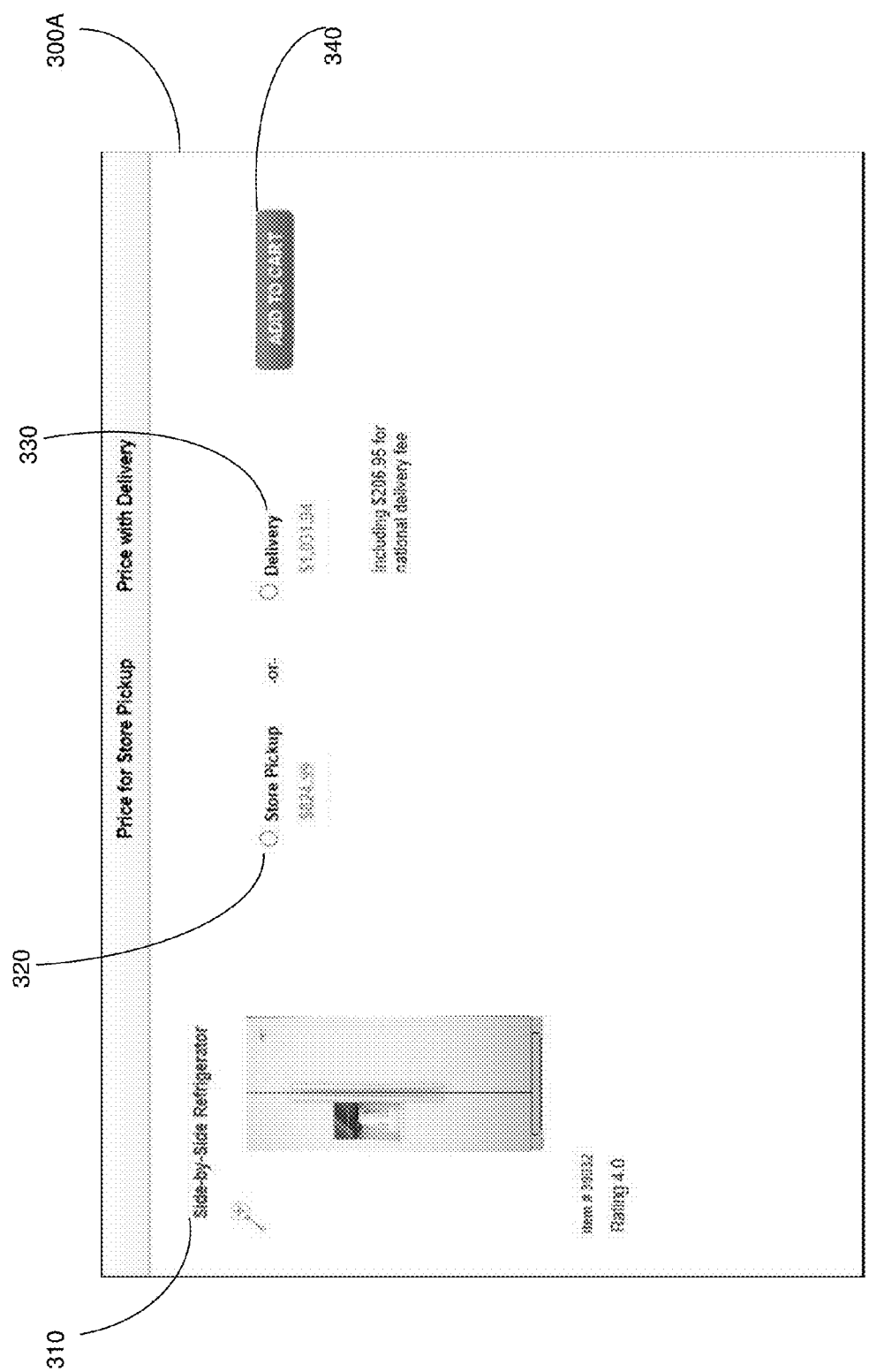
FIGS. 3A and 3B are screenshots showing a delayed display of content in accordance with an embodiment.
Figure 3B:
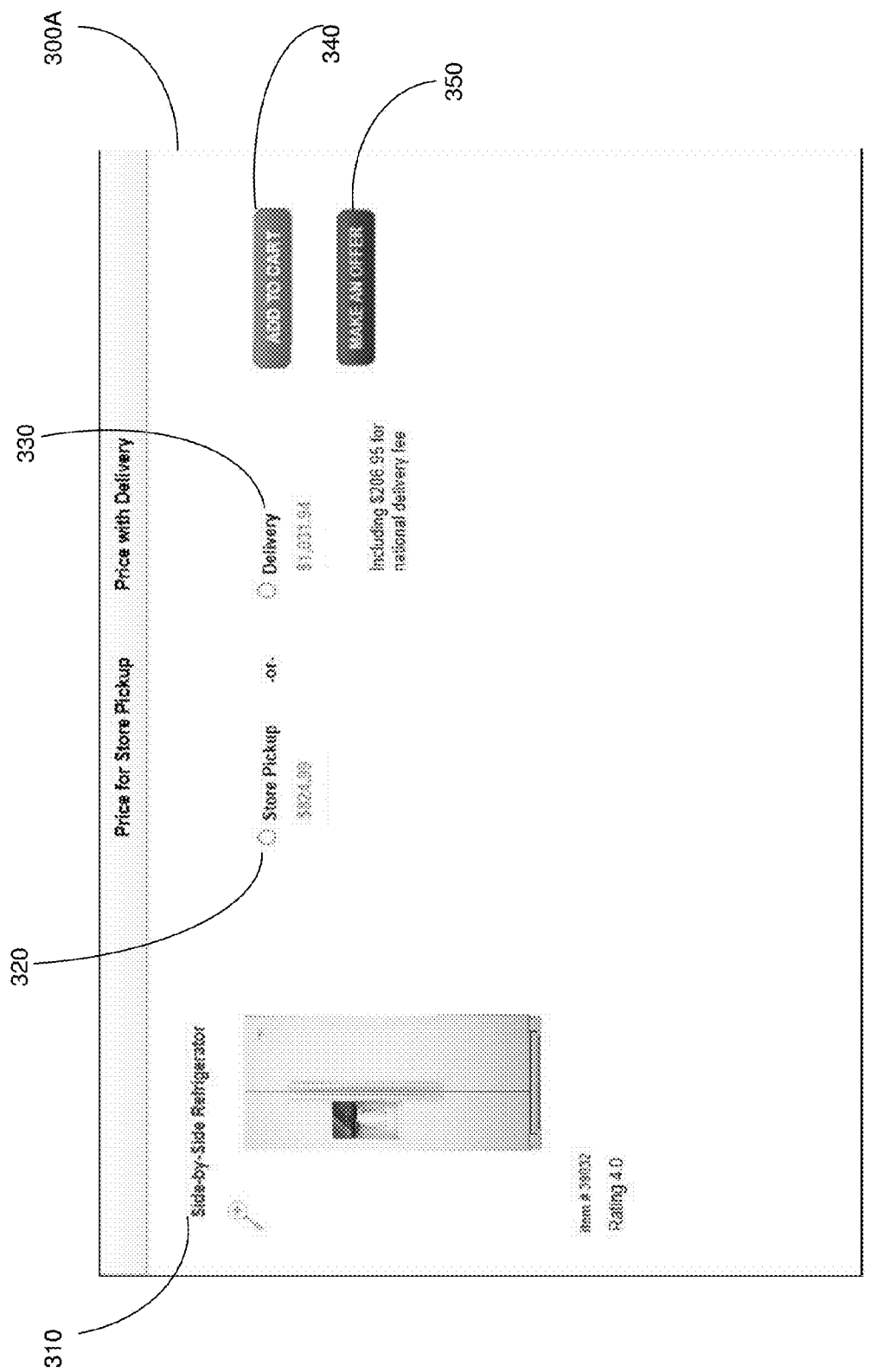

FIGS. 3A and 3B depict exemplary and non-limiting screenshots 300A and 300B, respectively, showing a delayed display of content in accordance with an embodiment. An e-commerce web-page 300A is shown, comprising an image and a description of a Side-by-Side refrigerator 310. The web-page 300A further comprises two prices for the refrigerator: a price for store pickup 320 and a price that includes the delivery cost to the user's resident 330. The web-page 300A further comprises an "add to cart" button 340. After reaching the value of the determined time-based threshold, a link 350 through which the user can make a counter offer is displayed in the web-page 300B.

The various embodiments of the invention may be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the invention and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A method for effectuating an electronic transaction between a consumer device and a merchant, comprising:
   receiving an indication that a user of the consumer device browses products for sale on an e-commerce web-site;
   collecting at least one parameter related to the user of the consumer device and at least one parameter related to the merchant;
   determining an interest of the user based on a product offered by the merchant on the e-commerce web-site, wherein the determination of the user interest is performed based on the least one parameter related to the user;
   determining a willingness of the merchant to sell the product, wherein the determination of the merchant willingness is performed based on the least one parameter related to the merchant;
   adjusting a time-based threshold value based on at least the determined user interest and the determined merchant willingness;
   selecting at least one motivational content item for display on the consumer device; and
   causing a display of the selected at least one motivational content item on a display of the consumer device, wherein the timing of the display is based on the time-based threshold value.

2. The method of claim 1, wherein the at least one parameter related to the user is at least one of: behavioral information related to the user, demographic information, a user experience, and a landing page.

3. The method of claim 2, wherein the behavioral information includes at least one of: an amount of time the user spent in a web source, the webpages the user visited, and the user's interaction with each web-page.

4. The method of claim 1, wherein the adjustment of the time-based threshold value is performed based in part on the merchant willingness and the user interest.

5. The method of claim 1, wherein the at least one parameter related to the merchant is at least one of: an inventory specification level, a special offer, a minimum for the product, and a minimum margin on the sale.

6. The method of claim 1, wherein determining the user interest is based on at least one of: an explicit identification, and an implicit identification.

7. The method of claim 1, wherein the at least one motivational content item is selected via a merchant device of the merchant.

8. The method of claim 1, wherein the at least one motivational content item includes at least a link inviting the user to make a counter offer on the product in interest.

9. A non-transitory computer readable medium having stored thereon instructions for causing one or more processing units to execute the method according to claim 1.

10. A system for effectuating an electronic transaction between a consumer device and a merchant, comprising:
    a processor; and
    a memory coupled to the processor, the memory contains instructions that, when executed by the processor, configured the system to:
    receive an indication that a user of the consumer device browses products for sale on an e-commerce web-site;
    collect at least one parameter related to the user of the consumer device and at least one parameter related to the merchant;
    determine an interest of the user based on a product offered by the merchant on the e-commerce web-site, wherein the determination of the user interest is performed based on the least one parameter related to the user;
    determine a willingness of the merchant to sell the product, wherein the determination of the merchant willingness is performed based on the least one parameter related to the merchant;
    adjust a time-based threshold value based on at least the determined user interest and the determined merchant willingness;
    select at least one motivational content item for display on the consumer device; and
    cause a display of the selected at least motivational content item, on a display of the consumer device, wherein the timing of the display is based on the time-based threshold value.

11. The system of claim 10, wherein the at least one parameter to the user is at least one of: behavioral information related to the user, demographic information, a user experience, and a landing page.

12. The system of claim 11, wherein the behavioral information includes at least one of: an amount of time the user spent in a web source, the web-pages the user visited, and the user's interaction with each web-page.

13. The system of claim 10, wherein the adjustment of the time-based threshold is performed based on the merchant willingness and the user interest.

14. The system of claim 10, wherein the at least one parameter related to the merchant is at least one of: an inventory specification level, a special offer, a minimum for the product, and a minimum margin on the sale.

15. The system of claim 10, wherein the system is further configured to determine the user interest based on least one of: an explicit identification, and an implicit identification.

16. The system of claim 10, wherein the at least one motivational content item is selected via a merchant device of the merchant.

17. The system of claim 10, wherein the at least one motivational content item includes at least a link inviting the user to make a counter offer on the product in interest.

* * * * *